(12) United States Patent
Aramoto et al.

(10) Patent No.: US 11,125,308 B2
(45) Date of Patent: Sep. 21, 2021

(54) BALL SCREW APPARATUS

(71) Applicant: JTEKT CORPORATION, Osaka (JP)

(72) Inventors: Gento Aramoto, Osaka (JP); Naoko Sakaguchi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 778 days.

(21) Appl. No.: 15/850,881

(22) Filed: Dec. 21, 2017

(65) Prior Publication Data

US 2018/0112752 A1 Apr. 26, 2018

Related U.S. Application Data

(62) Division of application No. 14/807,041, filed on Jul. 23, 2015, now Pat. No. 10,352,418.

(30) Foreign Application Priority Data

Aug. 1, 2014 (JP) ................................ 2014-158165
Dec. 1, 2014 (JP) ................................ 2014-242964

(51) Int. Cl.
*F16H 25/24* (2006.01)
*F16H 25/22* (2006.01)
(Continued)

(52) U.S. Cl.
CPC ......... *F16H 25/2454* (2013.01); *F16D 65/18* (2013.01); *F16H 25/2204* (2013.01); *F16H 25/2209* (2013.01); *F16H 25/2233* (2013.01); *F16H 25/2238* (2013.01); *F16H 25/24* (2013.01); *F16D 2121/24* (2013.01);
(Continued)

(58) Field of Classification Search
CPC .. F16D 2125/40; F16D 65/18; F16D 2121/24; F16D 2125/48; F16H 25/00; F16H 25/18; F16H 25/20; F16H 25/22; F16H 25/2204; F16H 25/2209; F16H 25/2233;
(Continued)

(56) References Cited

U.S. PATENT DOCUMENTS 1,905,039 A 4/1933 McKellar
2,844,044 A 7/1958 Cole
(Continued)

FOREIGN PATENT DOCUMENTS

DE 7 640 810 U1 7/1977
DE 7640180 U1 7/1977
(Continued)

OTHER PUBLICATIONS

Jul. 25, 2017 Office Action Issued in U.S. Appl. No. 14/807,041.
(Continued)

*Primary Examiner* — Joseph Brown
(74) *Attorney, Agent, or Firm* — Oliff PLC

(57) ABSTRACT

In a ball screw apparatus, a ball train including a plurality of main balls is housed in a raceway between a ball track of a ball nut and a ball track of a ball screw shaft. A coil spring housed in the raceway includes a first end that engages with an end of the ball train and a second end supported by a stopper (a first recessed portion, a protruding portion, or the like) of the ball nut. A stopper ball having a diameter larger than the diameter of the main ball is interposed between the stopper and the second end of the coil spring.

7 Claims, 10 Drawing Sheets

(51) Int. Cl.
*F16D 65/18* (2006.01)
*F16D 121/24* (2012.01)
*F16D 125/48* (2012.01)
*F16D 125/40* (2012.01)

(52) U.S. Cl.
CPC ...... *F16D 2125/40* (2013.01); *F16D 2125/48* (2013.01); *F16H 2025/2463* (2013.01)

(58) Field of Classification Search
CPC .. F16H 25/24; F16H 25/2409; F16H 25/2427; F16H 25/2454; F16H 2025/2463
USPC .......................................... 74/89.37, 424.89
See application file for complete search history.

(56) References Cited

U.S. PATENT DOCUMENTS

| | | |
|---|---|---|
| 8,616,348 B2 | 12/2013 | Winkler et al. |
| 8,671,789 B2 | 3/2014 | Osterlaenger et al. |
| 8,875,851 B2 | 11/2014 | Winkler |
| 9,593,752 B2 | 3/2017 | Adler et al. |
| 9,863,514 B2 * | 1/2018 | Tashiro ................... F16D 65/18 |
| 9,976,614 B2 | 5/2018 | Gerber et al. |
| 2005/0247149 A1 | 11/2005 | Osterlanger et al. |
| 2009/0283371 A1 | 11/2009 | Winkler et al. |
| 2010/0193302 A1 | 8/2010 | Schumann et al. |
| 2011/0120247 A1 | 5/2011 | Osterlaenger et al. |
| 2011/0162935 A1 | 7/2011 | Winkler et al. |
| 2012/0018262 A1 | 1/2012 | Winkler |
| 2015/0033891 A1 | 2/2015 | Sakaguchi et al. |
| 2015/0330487 A1 | 11/2015 | Wilhelm et al. |
| 2015/0362051 A1 | 12/2015 | Adler et al. |
| 2016/0033018 A1 | 2/2016 | Tashiro |
| 2016/0033019 A1 | 2/2016 | Aramoto et al. |
| 2018/0017147 A1 | 1/2018 | Kreutzer et al. |
| 2018/0283510 A1 | 10/2018 | Tashiro |
| 2018/0283511 A1 | 10/2018 | Tashiro |

FOREIGN PATENT DOCUMENTS

| | | |
|---|---|---|
| FR | 2337285 A1 | 7/1977 |
| JP | 2010-505072 A | 2/2010 |

OTHER PUBLICATIONS

U.S. Appl. No. 14/807,041, filed Jul. 23, 2015 in the name of Aramoto et al.
Nov. 27, 2017 Office Action Issued in U.S. Appl. No. 14/807,041.
U.S. Appl. No. 15/850,717, filed Dec. 21, 2017 in the name of Aramoto et al.
Jun. 12, 2020 Office Action Issued in U.S. Appl. No. 16/162,844.
Dec. 9, 2019 Office Action Issued in U.S. Appl. No. 15/850,717.

* cited by examiner

BALL SCREW APPARATUS

INCORPORATION BY REFERENCE

This is a Division of U.S. application Ser. No. 14/807,041 filed Jul. 23, 2015, which claims the benefit of Japanese Application No. 2014-158165 filed Aug. 1, 2014 and Japanese Application No. 2014-242964 filed Dec. 1, 2014. The disclosures of the prior applications are hereby incorporated by reference therein in their entireties.

BACKGROUND OF THE INVENTION

1. Field of the Invention

The invention relates to a ball screw apparatus.

2. Description of Related Art

There has been proposed a ball screw apparatus with a ball train interposed between a ball track in an outer periphery of a ball screw shaft and a ball track in an inner periphery of a ball nut. In the ball screw apparatus, a coil spring is interposed between a ball at an end of the ball train and a stopper pin fixed to the ball nut (see, for example, Published Japanese Translation of PCT Application No. 2010-505072 (JP 2010-505072 A)). In such a non-circulating ball screw apparatus, the coil spring does not contract when the ball screw shaft is rotationally driven with a low axial load imposed on the ball screw shaft. Thus, the balls in the ball train do not move relative to the ball nut. Therefore, the ball screw moves with the balls in the ball train sliding on the ball screw shaft.

On the other hand, when the ball screw is rotationally driven with a high axial load imposed on the ball screw shaft, the coil spring contracts to allow the ball screw to move with the balls rolling with respect to both the ball nut and the ball screw shaft. Thus, efficient screw power transmission is achieved.

The coil spring is housed in a raceway between the ball screw shaft and the ball nut. Thus, when the ball screw shaft is rotationally driven, the shape of the coil spring is likely to be distorted. Consequently, the coil spring may interfere with the ball crew shaft to cause wear or the like.

SUMMARY OF THE INVENTION

An object of the present invention is to provide a ball screw apparatus that allows the orientation of the coil spring to be stabilized.

According to an aspect of the present invention, a ball screw apparatus includes: a ball nut including an inner periphery, a ball track formed in the inner periphery, and a stopper; a ball screw shaft including an outer periphery and a ball track formed in the outer periphery, the ball screw shaft being inserted through the ball nut; a ball train including a plurality of main balls housed in a raceway formed between the ball track of the ball nut and the ball track of the ball screw shaft; a coil spring including a first end that engages with at least one end of the ball train and a second end supported by the stopper and housed in the raceway; and at least one stopper ball interposed between the stopper and the second end of the coil spring and having a larger diameter than the main ball.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
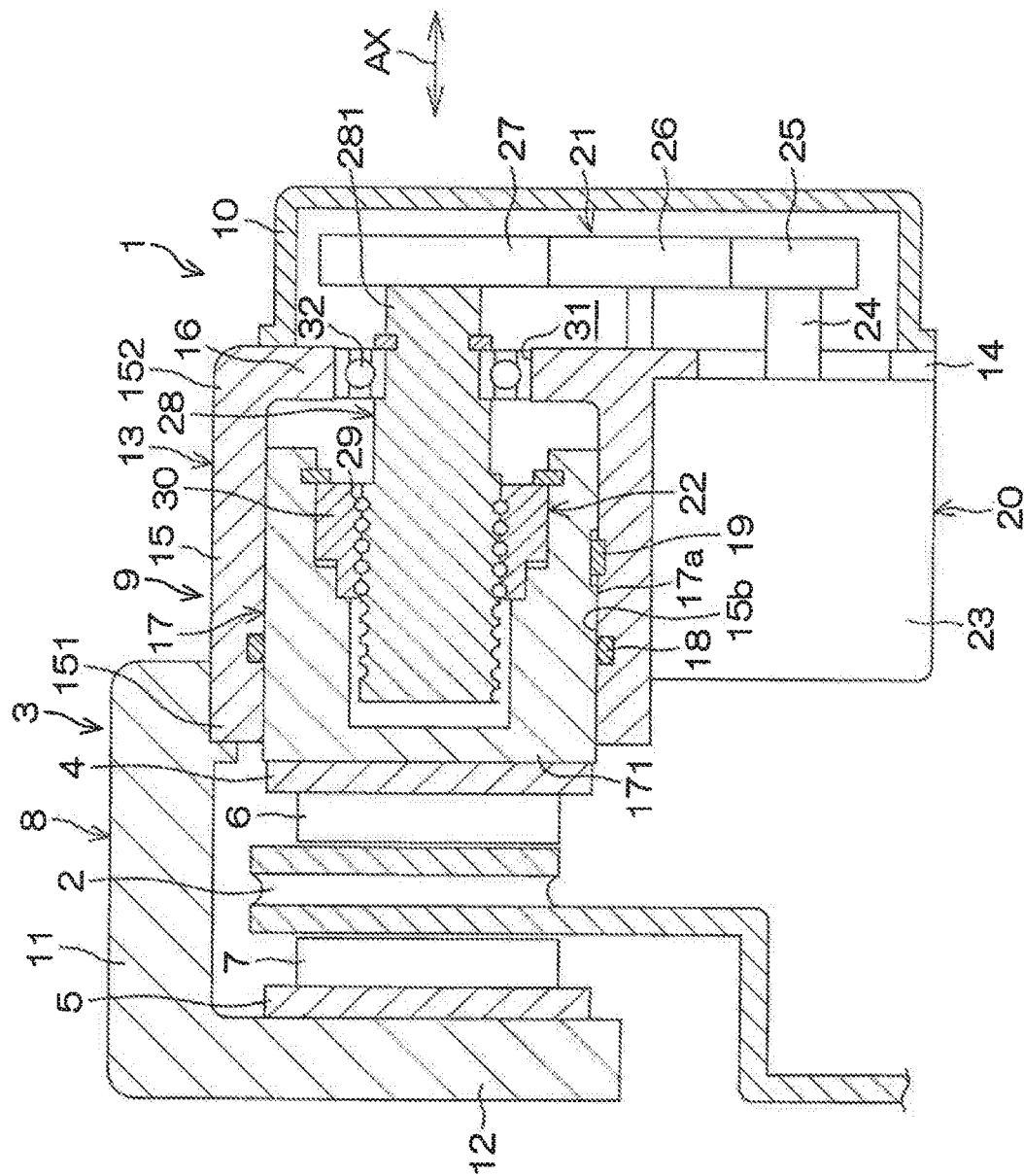
FIG. 1 is a schematic sectional view of a brake apparatus to which a ball screw apparatus of a first embodiment of the present invention is applied, illustrating a non-braking state.

Embodiments of the present invention will be described below in detail with reference to the attached drawings. FIG. 1 is a schematic sectional view of a non-braking state of a brake apparatus 1 to which a ball screw apparatus 22 of a first embodiment of the present invention is applied. The brake apparatus 1 is an apparatus that applies a frictional braking force to a disc 2 rotating integrally with a wheel of an automobile or the like The brake apparatus 1 includes a floating caliper 3, a first backup plate 4 and a second backup plate 5, and a first pad 6 and a second pad 7. The caliper 3 is movably supported by, for example, a knuckle (not depicted in the drawings). The first backup plate 4 and the second backup plate 5 are disposed so as to sandwich the disc 2 between the first backup plate 4 and the second backup plate 5, and supported by the caliper 3 so as to be able to move closer to and move away from each other. The first pad 6 and the second pad 7 are fixed to the first backup plate 4 and the second backup plate 5, respectively, and can press respective side surfaces of the disc 2.

The caliper 3 includes a first body 8, a second body 9, and a cover 10. The first body 8 and the second body 9 are fixed together. The cover 10 is fixed to the second body 9. The first body 8 includes a body portion 11 and an arm portion 12. One end of the second body 9 is fixed to the body portion 11. The arm portion 12 is coupled orthogonally to the body portion 11. The second backup plate 5 is fixed to the arm portion 12. The second body 9 includes a cylinder 13 (corresponding to a brake cylinder) and an extension plate 14. The cylinder 13 is fixed to the body portion 11 of the first body 8. The extension plate 14 extends from the cylinder 13.

The cylinder 13 has a first end 151 and a second end 152 that are opposite to each other in an axial direction AX. The cylinder 13 includes a cylindrical portion 15 that is open at the first end 151 and an end surface plate 16 coupled to the second end 152 of the cylindrical portion 15. A piston (housing) 17 (corresponding to a brake piston) that is movable in the axial direction AX is housed in the cylinder 13. An end 171 of the piston 17 protrudes toward the disc 2 through an opening portion at an end of the cylinder 13 (that corresponds to the first end 151 of the cylindrical portion 15) and is fixed to the first backup plate 4.

A seal member 18 is interposed between an outer periphery 17a of the piston 17 and an inner periphery of the cylinder 13 (that corresponds to an inner periphery 15b of the cylindrical portion 15) to seal the gap between the outer periphery 17a and the inner periphery. The seal member 18 may be an O ring housed in a housing groove formed in the inner periphery of the cylinder 13 (the inner periphery 15b of the cylindrical portion 15). The outer periphery 17a of the piston 17 and the inner periphery of the cylinder 13 (the inner periphery 15b of the cylindrical portion 15) are coupled together via a key 19 provided in keyways formed in the outer periphery 17a and the inner periphery. Key coupling using the key 19 allows movement of the piston 17 in the axial direction AX to be guided and also allows rotation of the piston 17 with respect to the cylinder 13 to be regulated.

A hydraulic pressure that biases the piston 17 toward the disc 2 may be supplied into the cylinder 13 through a hydraulic path not depicted in the drawings. In that case, the cylinder 13 and the piston 17 form a hydraulic actuator. The caliper 3 functions to press both of the pads 6 and 7 against the disc 2 to generate a braking force. The caliper 3 includes an electric motor 20, a speed reduction apparatus 21, and the ball screw apparatus 22. The speed reduction apparatus 21 reduces the rotation speed of the electric motor 20. The ball screw apparatus 22 converts rotary motion transmitted from the electric motor 20 via the speed reduction apparatus 21 into linear motion of the piston 17 in the axial direction AX.

The electric motor 20 includes a motor housing 23 and an output shaft 24. The motor housing 23 is fixed to the extension plate 14 of the second body 9. The speed reduction apparatus 21 includes a driving gear 25, an idle gear 26, and a driven gear 27. The driving gear 25 is attached to one end of the output shaft 24 of the electric motor 20 so as to rotate together with the output shaft 24. The idle gear 26 meshes with the driving gear 25. The driven gear 27 meshes with the idle gear 26. The idle gear 26 is pivotally supported by the second body 9 so as to be rotatable. The cover 10 is fixed to the second body 9 so as to cover the speed reduction apparatus 21.

Figure 2:
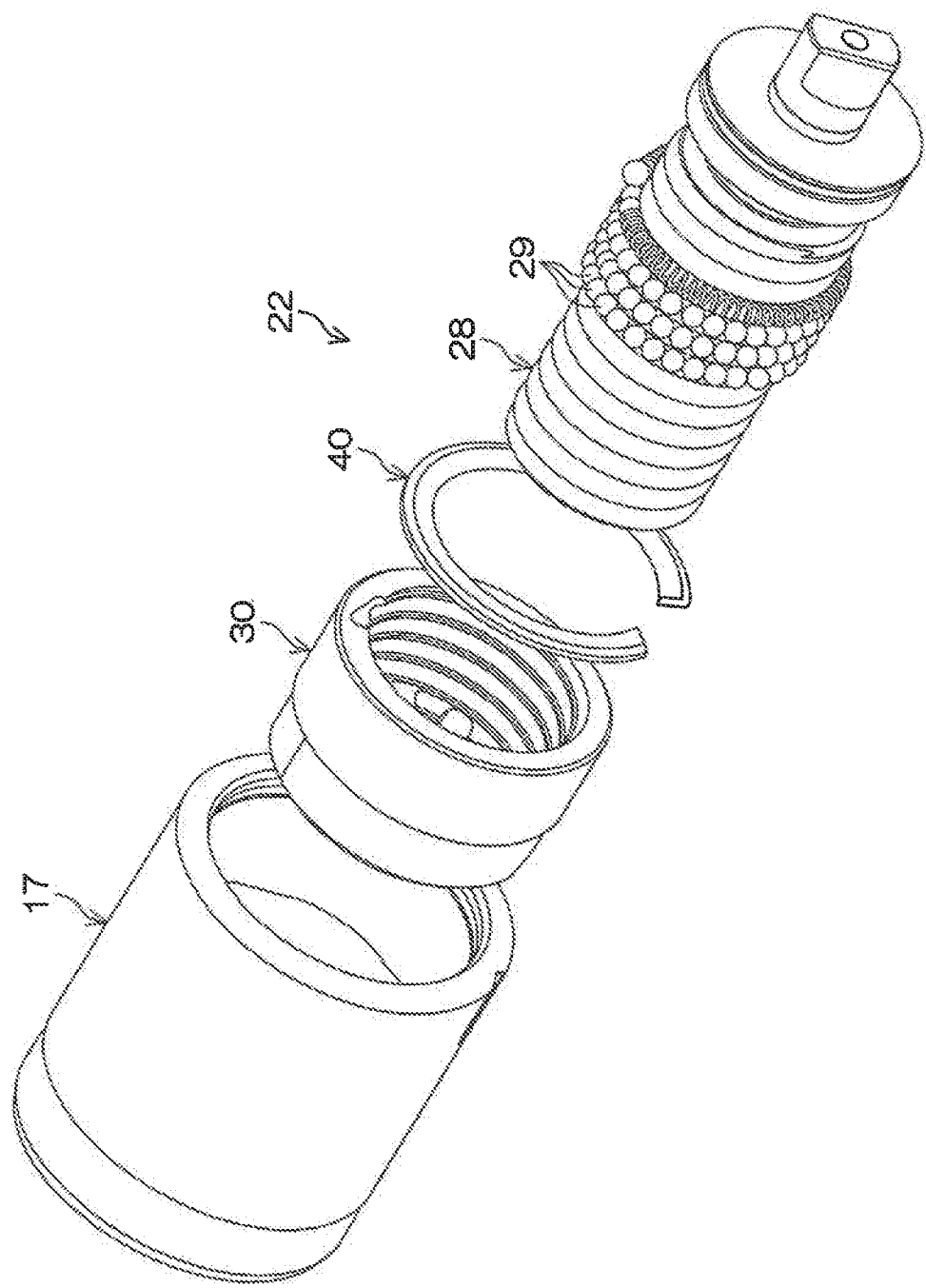
FIG. 2 is an exploded perspective view depicting the configuration of the ball screw apparatus.

FIG. 2 is an exploded perspective view depicting the configuration of the ball screw apparatus 22. In FIG. 2, a configuration including the piston 17 is represented as the ball screw apparatus 22. As depicted in FIG. 1 and FIG. 2, the ball screw apparatus 22 includes a ball screw shaft 28, a ball nut 30, a retaining ring 40 (annular member), and the piston 17. The ball screw shaft 28 is an input member. The ball nut 30 is a rotatable output member screwed on the ball screw shaft 28 via a plurality of main balls 29. The ball screw shaft 28 is inserted through the ball nut 30. The ball screw shaft 28 is supported by the second body 9 so as to be immovable in the axial direction but to be rotatable. The ball nut 30 is supported by the second body 9 so as to be movable in the axial direction and to be non-rotatable.

Figure 3:
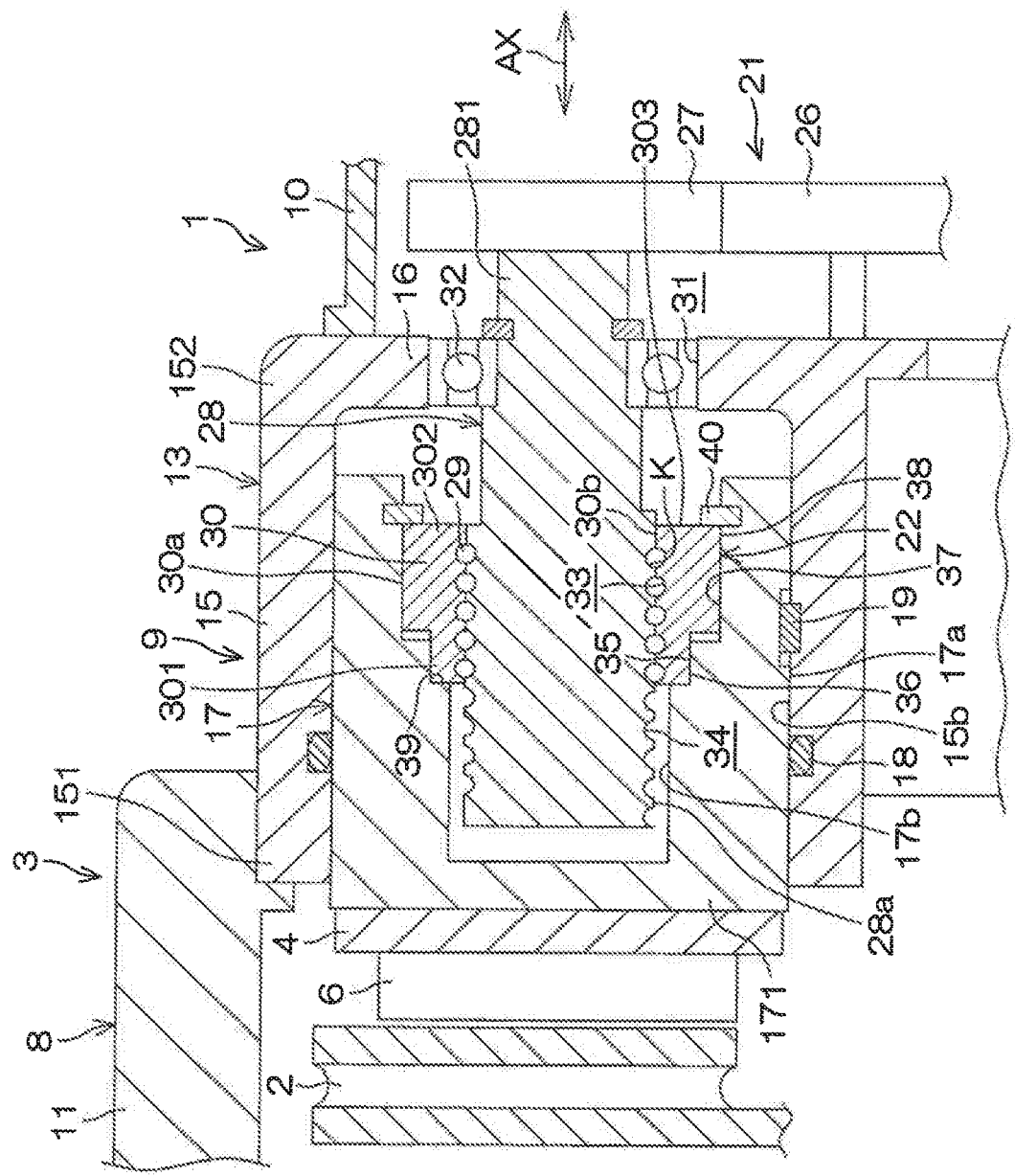
FIG. 3 is an enlarged sectional view of an enlarged part of FIG. 1, depicting the main part of the brake apparatus.

As depicted in FIG. 1, specifically, the ball screw shaft 28 is supported by a rolling bearing 32 held in a support hole 31 formed in the end surface plate 16 of the cylinder 13 such that the ball screw shaft 28 is rotatable and immovable in the axial direction (axial direction AX). The driven gear 27 is coupled to an end 281 of the ball screw shaft 28 so as to rotate together with the ball screw shaft 28. FIG. 3 is a sectional view of an enlarged part of FIG. 1. As depicted in FIG. 3, the ball nut 30 has an outer periphery 30a and an inner periphery 30b. A ball track 33 is formed in the inner periphery 30b. The ball screw shaft 28 has an outer periphery 28a in which a ball track 34 is formed. The main balls 29 forming a train are interposed between the ball track 33 and the ball track 34.

The outer periphery 30a of the ball nut 30 includes a rotation regulation portion 36 and a cylindrical surface portion 38. The rotation regulation portion 36 is engaged with a rotation regulation portion 35 of an inner periphery 17b of the piston 17. The cylindrical surface portion 38 is fitted on a cylindrical surface portion 37 of the inner periphery 17b of the piston 17. The engagement between the rotation regulation portions 35 and 36 regulates rotation of the piston 17 and the ball nut 30 relative to each other.

The ball nut 30 includes a first end 301 closer to the disc 2 and a second end 302 that is on the opposite side from the first end 301, in the axial direction AX (ball nut axial direction).

The first end 301 of the ball nut 30 is in contact with a positioning step portion 39 of the inner periphery 17b of the piston 17. The retaining ring (annular member) 40 fitted in an annular groove formed in the inner periphery 17b of the piston 17 is engaged with an end surface 303 of the second end 302 of the ball nut 30. Thus, the piston 17 and the ball nut 30 are coupled together so as to move together in the axial direction AX.

Figure 4A:
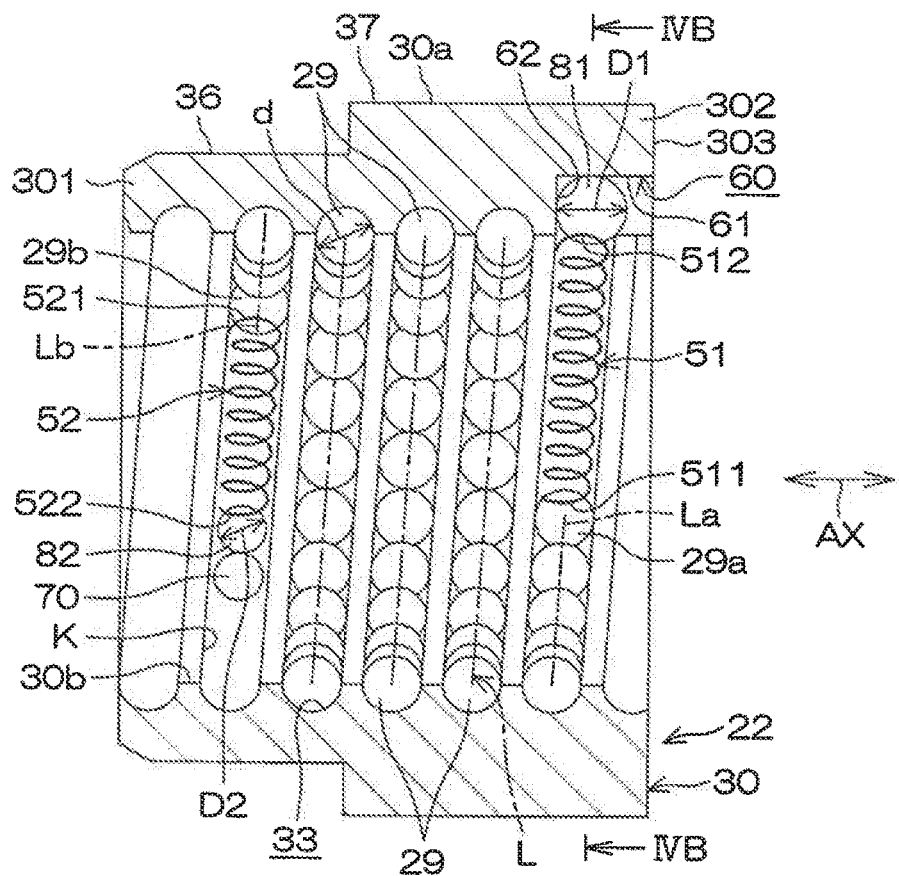
FIG. 4A is a sectional view of the ball screw apparatus in which illustration of a ball screw shaft is omitted.
Figure 4B:
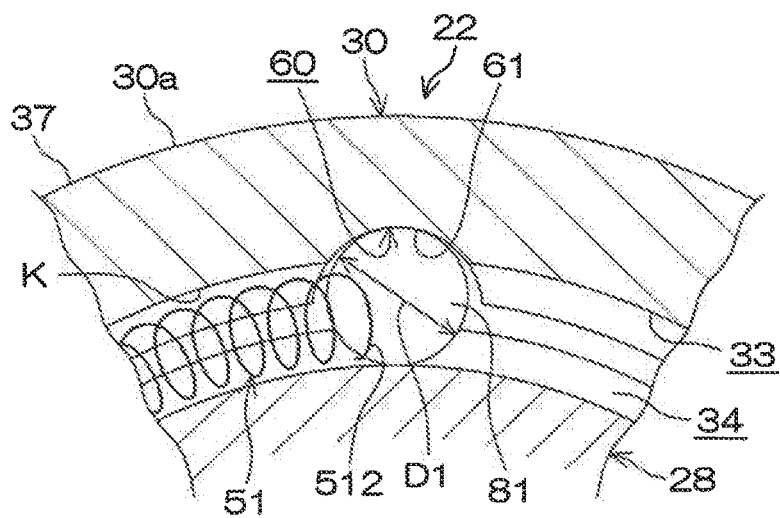
FIG. 4B is a sectional view taken along line IVB-IVB in FIG. 4A and depicting a cross section of the ball screw shaft.

When rotation of the output shaft 24 of the electric motor 20 is transmitted to the ball screw shaft 28 via the speed reduction apparatus 21 to rotate the ball screw shaft 28, the ball nut 30 moves in the axial direction AX. At this time, the piston 17 is guided by the key 19 and moves together with the ball nut 30 in the axial direction AX. FIG. 4A is an enlarged sectional view of the ball nut 30. FIG. 4B is a schematic sectional view taken along line IVB-IVB in FIG. 4A.

As depicted in FIG. 4A, the main balls 29 held in the ball track 33 in the ball nut 30 form a ball train L arranged along a raceway K formed between the ball track 33 and the ball track 34. The ball train L includes a first end La and a second end Lb. The ball screw apparatus 22 includes a first coil spring 51 and a second coil spring 52 disposed on the respective opposite sides of the ball train L in the raceway K.

The first coil spring 51 includes a first end 511 that engages with a main ball 29a at the first end La of the ball train L and a second end 512. The second coil spring 52 includes a first end 521 that engages with a main ball 29b at the second end Lb of the ball train L and a second end 522. As depicted in FIG. 4B, a first recessed portion (recessed portion) 60 serving as a first stopper is formed in the inner periphery 30b of the ball nut 30. The first recessed portion 60 is open in the end surface 303 of the second end 302 of the ball nut 30. The first recessed portion 60 is formed, for example, by forging in the axial direction AX.

Figure 5:
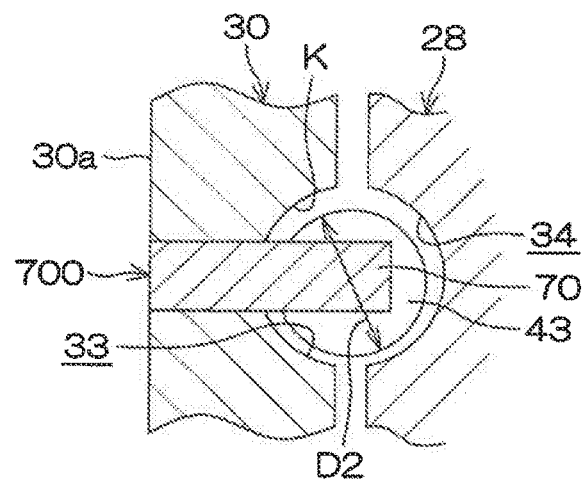
FIG. 5 is a sectional view of the main part of the ball screw apparatus.

The ball screw apparatus 22 includes a first stopper ball 81 held in the first recessed portion 60 (first stopper) and interposed between the first recessed portion 60 and the second end 512 of the first coil spring 51. The second end 512 of the first coil spring 51 is supported by the first recessed portion 60 via the first stopper ball 81. As depicted in FIG. 4A and FIG. 5, the ball screw apparatus 22 includes a protruding portion 70 that protrudes into the raceway K and that serves as a second stopper. The protruding portion 70 is a part of a stopper pin 700 penetrating the ball nut 30 and is formed by the part of the stopper pin 700 that protrudes into the ball track 33.

Figure 6:
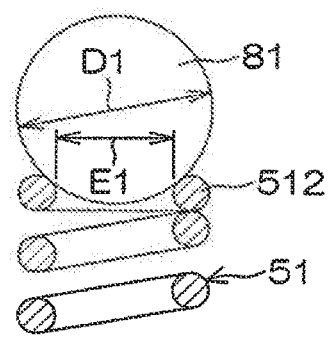
FIG. 6 is a schematic diagram illustrating a relation between a second end of a first coil spring and a first stopper ball.

The ball screw apparatus 22 includes a second stopper ball 82 housed in the raceway K and interposed between the protruding portion 70 serving as a second stopper and the second end 522 of the second coil spring 52. The second end 522 of the second coil spring 52 is supported by the protruding portion 70 (second stopper) via the second stopper ball 82 housed in the raceway K. As depicted in FIG. 6, the diameter D1 of the first stopper ball 81 is larger than the inside diameter E1 of an end turn portion of the first coil spring 51 corresponding to the second end 512 (D1>E1). The first stopper ball 81 functions to support the first coil spring 51 by being in contact with an inner periphery of the second end 512 (end turn portion) of the first coil spring 51.

As seen in FIG. 4(A), the diameter D1 of the first stopper ball 81 is larger than the diameter of the main ball 29 (D1>d). The diameter D2 of the second stopper ball 82 may be the same as the diameter d of the main ball 29 (D2=d) or may be smaller than the diameter d of the main ball 29 (D2<d).

Figure 7:
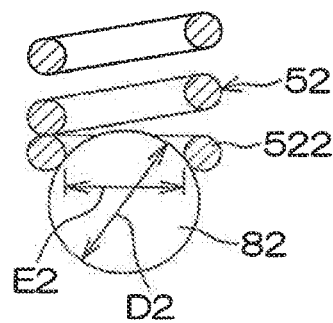
FIG. 7 is a schematic diagram illustrating a relation between a second end of a second coil spring and a second stopper ball.

As depicted in FIG. 7, the diameter D2 of the second stopper ball 82 is larger than the inside diameter E2 of an end turn portion of the second coil spring 52 corresponding to the second end 522 (D2>E2). The second stopper ball 82 functions to support the second coil spring 52 by being in contact with an inner periphery of the second end 522 (end turn portion) of the second coil spring 52. As seen in FIG. 4(A), the diameter D2 of the second stopper ball 82 may be equivalent to the diameter d of the main ball 29 (D2=d) or may be smaller than the diameter of the main ball 29 (D2<d).

The first recessed portion 60 of the ball nut 30 has a first surface 61 and a second surface 62. The first surface 61 is a bearing surface that supports the second end 512 of the first coil spring 51 via the first stopper ball 81. The second surface 62 regulates movement of the first stopper ball 81 in the axial direction AX. The first surface 61 may be curved (for example, shaped like a circular arc) in an axially perpendicular cross section depicted in FIG. 4B. Although not depicted in the drawings, the first surface 61 may be defined by two planes intersecting each other. As depicted in FIG. 4A, the second surface 62 may be a surface orthogonal to the axial direction AX.

When the ball screw shaft 28 is rotationally driven with a low axial load imposed on the ball screw shaft 28, the coil springs 51 and 52 do not contract. Thus, the main balls 29 of the ball train L do not move relative to the ball nut 30. Therefore, the ball nut 30 moves with the main balls 29 of the ball train L sliding on the ball track 33. On the other hand, when the ball screw shaft 28 is rotationally driven with a high axial load imposed on the ball screw shaft 28, the coil springs 51 and 52 contract. Thus, the ball nut 30 moves with the main balls 29 of the ball train L rolling with respect to both the ball nut 30 and the ball screw shaft 28. Consequently, efficient screw power transmission is achieved.

According to the first embodiment, at least one of the first stopper (first recessed portion 60) and the second stopper (protruding portion 70) (in the present embodiment, both the first and second stoppers) supports a corresponding one of the second ends 512 and 522 of the coil springs 51 and 52 via a corresponding one of the stopper balls 81 and 82 as depicted in FIG. 4A. Therefore, the orientations of the second ends 512 and 522 of the coil springs 51 and 52 are stabilized to allow distortion of the shapes of the coil springs 51 and 52 to be suppressed. As a result, the orientations of the coil springs 51 and 52 can be stabilized. This in turn allows suppression of wear resulting from contact between the ball screw shaft 28 and the coil springs 51 and 52.

Specifically, the first recessed portion 60 formed in the inner periphery 30b of the ball nut 30 and serving as the first stopper supports the second end 512 of the first coil spring 51 via the first stopper ball 81 housed in the first recessed portion 60. Therefore, the orientation of the second end 512 of the first coil spring 51 is stabilized to allow the orientation of the first coil spring 51 to be stabilized.

The diameter D1 of the first stopper ball 81 is larger than the diameter d of the main ball 29 (D1>d). Thus, the first stopper ball 81 is suppressed from falling off from the ball nut 30 toward the ball screw shaft 28. Therefore, the first stopper ball 81 is stably held by the first recessed portion 60. Consequently, the orientation of the second end 512 of the first coil spring 51 can be more stabilized.

As depicted in FIG. 6, the first stopper ball 81 functions to support the first coil spring 51 by being in contact with the inner periphery of the end turn portion of the first coil spring 51 corresponding to the second end 512. Thus, the orientation of the second end 512 of the first coil spring 51 can be more stabilized. As depicted in FIG. 4A, the protruding portion 70 protruding into the ball track 33 and serving as the second stopper supports the second end 522 of the second coil spring 52 via the second stopper ball 82 housed in the raceway K. Therefore, the orientation of the second end 522 of the second coil spring 52 is stabilized to allow the orientation of the second coil spring 52 to be stabilized.

When the diameter D2 of the second stopper ball 82 is equivalent to the diameter d of the main ball 29 (D2=d), the second stopper ball 82 and the main ball 29 may be the same ball. Therefore, the number of components is reduced to enable a reduction in manufacturing costs. When the diameter D2 of the second stopper ball 82 is smaller than the diameter d of the main ball 29 (D2<d), the second stopper ball 82 is subjected to no load at the time of power transmission. Thus, the orientation of the second end 522 of the second coil spring 52 can be more stabilized.

Figure 8:
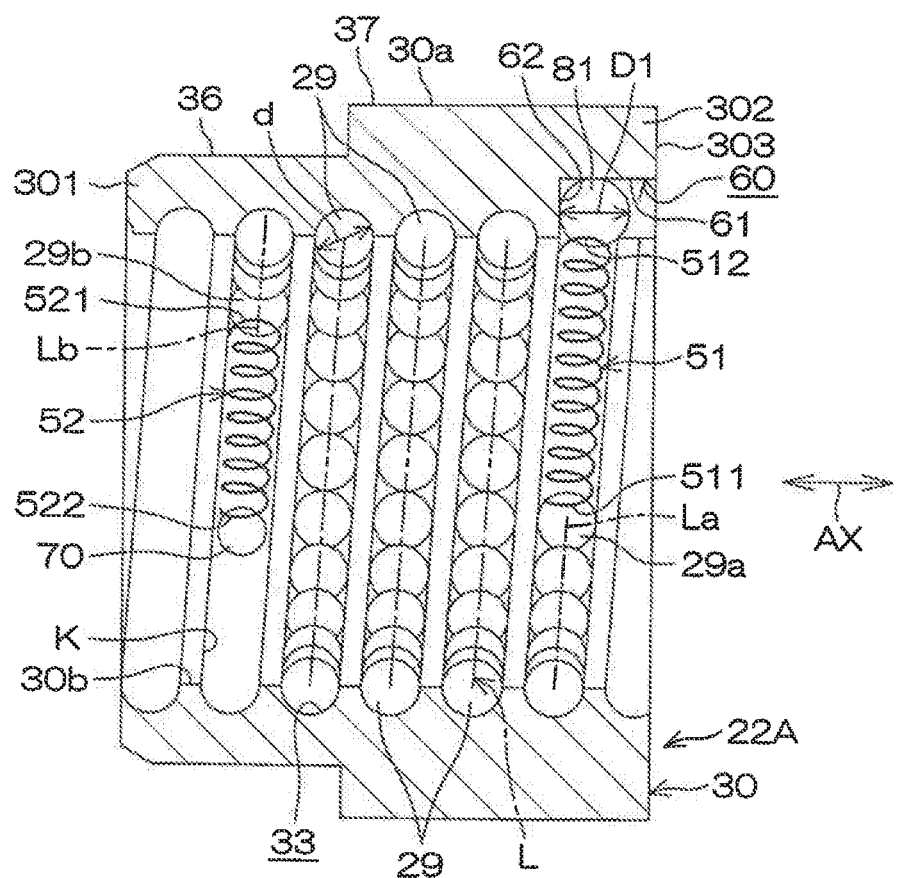
FIG. 8 is a sectional view of a ball screw apparatus of a second embodiment of the present invention in which illustration of a ball screw shaft is omitted.

As depicted in FIG. 7, the second stopper ball 82 functions to support the second coil spring 52 by being in contact with the inner periphery of the end turn portion of the second coil spring 52 corresponding to the second end 522. Thus, the orientation of the second end 522 of the second coil spring 52 can be more stabilized. Alternatively, although not depicted in the drawings, two or more first stopper balls 81 may be interposed between the first recessed portion 60 serving as the first stopper and the second end 512 of the first coil spring 51 in the first embodiment. Two or more second stopper balls 82 may be interposed between the protruding portion 70 serving as the second stopper and the second end 522 of the second coil spring 52 in the first embodiment. FIG. 8 is a sectional view of a ball screw apparatus 22A of a second embodiment. Illustration of the ball screw shaft is omitted in FIG. 8. The ball screw apparatus 22A of the second embodiment in FIG. 8 is different from the ball screw apparatus 22 of the first embodiment in FIG. 4A in that the second stopper ball 82 is removed and in that the second end 522 of the second coil spring 52 is directly engaged with and supported by the protruding portion 70 (second stopper).

Figure 9A:
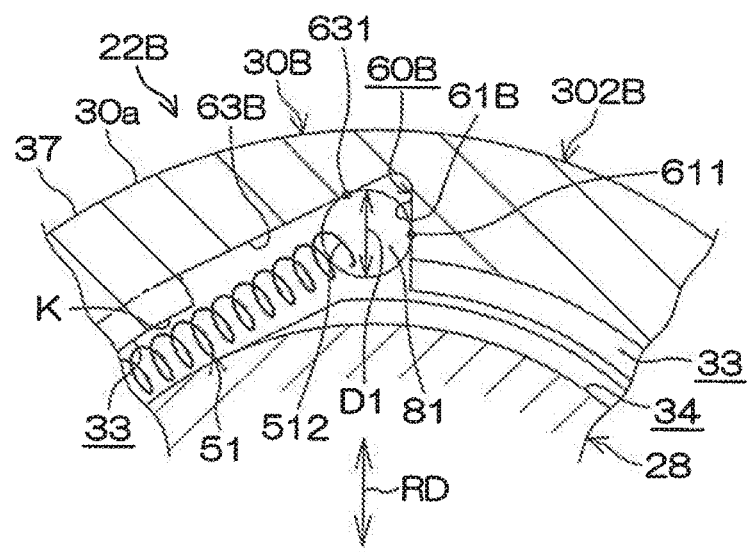
FIG. 9A is a schematic sectional view of a second end of a ball nut included in a ball screw apparatus of a third embodiment of the present invention.

Components of the second embodiment in FIG. 8 which are the same as those of the first embodiment in FIG. 4A are denoted by the same reference numerals as those in the first embodiment. For the first stopper ball 81, the second embodiment can also produce the same effects as those of the first embodiment. Although not depicted in the drawings, two or more first stopper balls 81 may be interposed between the first recessed portion 60 serving as the first stopper and the second end 512 of the first coil spring 51 in the second embodiment. FIG. 9A is a schematic sectional view of the second end 302 of the ball nut 30 included in a ball screw apparatus 22B of a third embodiment of the present invention. FIG. 9A is taken along line equivalent to the line IVB-IVB in FIG. 4A.

Figure 9B:
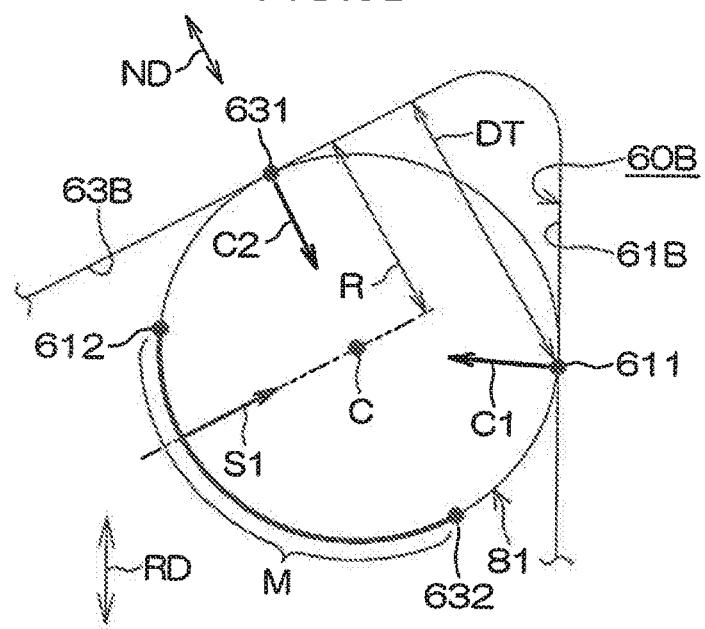
FIG. 9B is a schematic diagram illustrating a force applied to a stopper ball.

Components of the third embodiment in FIGS. 9A and 9B which are the same as those of the first embodiment in FIG. 4A are denoted by the same reference numerals as those in the first embodiment. The ball screw apparatus 22B of the third embodiment in FIGS. 9A and 9B is different from the ball screw apparatus 22 of the first embodiment in FIG. 4A in that, as the first stopper, a first recessed portion (recessed portion) 60B is formed instead of the first recessed portion 60. The first recessed portion 60B supports the second end 512 of the first coil spring 51 via the first stopper ball 81. The first recessed portion 60B has a substantially circular arc shape in an axially perpendicular cross section depicted in FIG. 9A.

The first recessed portion 60B includes a first surface 61B, a second surface 63B, and a regulation surface (not depicted in the drawings). The first surface 61B is a bearing surface that supports the second end 512 of the first coil spring 51 via the first stopper ball 81. The second surface 63B intersects the first surface 61B to define a bottom surface of the first recessed portion 60B. The regulation surface intersects each of the first surface 61B and the second surface 63B to regulate movement of the first stopper ball 81 in the axial direction AX (see FIG. 4A or the like). The second surface 63B is, for example, planar, and intersects the first surface 61B at an acute angle. The surface of the first stopper ball 81 is in point contact with the first surface 61B at a first contact point 611, and with the second surface 63B at a second contact point 631. The first recessed portion 60B is open in the end surface 303 (see FIG. 4A or the like) at the second end 302 of the ball nut 30 and is formed by forging in the axial direction AX, as is the case with the first recessed portion 60.

The first stopper ball 81 is preferably held by the ball nut 30 so as not to cause a backlash in a ball nut radial direction RD. As a result of a backlash of the first stopper ball 81 in the ball nut radial direction RD, the first stopper ball 81 may move in the ball nut radial direction RD and may be brought into contact with the ball screw shaft 28, which may cause wear. FIG. 9B is a schematic diagram illustrating a force acting on the first stopper ball 81. As depicted in FIG. 9B, the first stopper ball 81 to which a spring force S1 from the first coil spring 51 (the force toward the center C of the first stopper ball 81) is applied is subjected to a reaction force C1 applied from the first surface 61B (the force toward the center C of the first stopper ball 81) and a reaction force C2 applied from the second surface 63B (the force toward the center C of the first stopper ball 81). If the reaction force C2 applied from the second surface 63B is present (if the reaction force C2 is larger than zero), the first stopper ball 81 is pressed against the second surface 63B.

In the third embodiment, a distance DT between the first contact point 611 and the second contact point 631 in a normal direction ND is set larger than the radius R of the first stopper ball 81 (=D1/2) (DT>D1/2). Thus, the reaction force C2 is present which is applied to the second contact point 631 of the first stopper ball 81 from the second surface 63B. If the reaction force C2 applied to the second contact point 631 from the second surface 63B is present (if the reaction force C2 is larger than zero), the first stopper ball 81 is pressed against the second surface 63B.

From another viewpoint, the spring force S1 from the first coil spring 51 toward the center C of the first stopper ball 81 is applied to a predetermined position in an intermediate area M (depicted by a thick line in FIG. 9B) between a first opposite position 612 that is 180 degrees opposite to the first contact point 611 across the center C of the first stopper ball 81 and a second opposite position 632 that is 180 degrees opposite to the second contact point 631 across the center C of the first stopper ball 81 in a cross section perpendicular to the axial direction (axial direction AX) of the ball nut 30. In this case, the first stopper ball 81 is pressed against the second surface 63B.

In addition to advantageous effects equivalent to those of the first embodiment, the third embodiment produces the following advantageous effects. That is, the spring force S1 from the first coil spring 51 is applied to the intermediate area M between the first opposite position 612 and the second opposite position 632 in the surface of the first stopper ball 81. Thus, the first stopper ball 81 can be kept pressed against the second contact point 631. This prevents the first stopper ball 81 from moving toward the ball screw shaft 28. Consequently, the first stopper ball 81 can be held without a backlash in the ball nut radial direction RD.

Furthermore, the distance DT between the first contact point 611 and the second contact point 631 in the normal direction ND is set larger than the radius R of the first stopper ball 81. The reaction force C2 is present which is applied to the second contact point 631 of the first stopper ball 81 by the second surface 63B. Consequently, the first stopper ball 81 can be effectively pressed against the second surface 63B. As a result, a backlash of the first stopper ball 81 in the ball nut radial direction RD can be more effectively suppressed.

Figure 10:
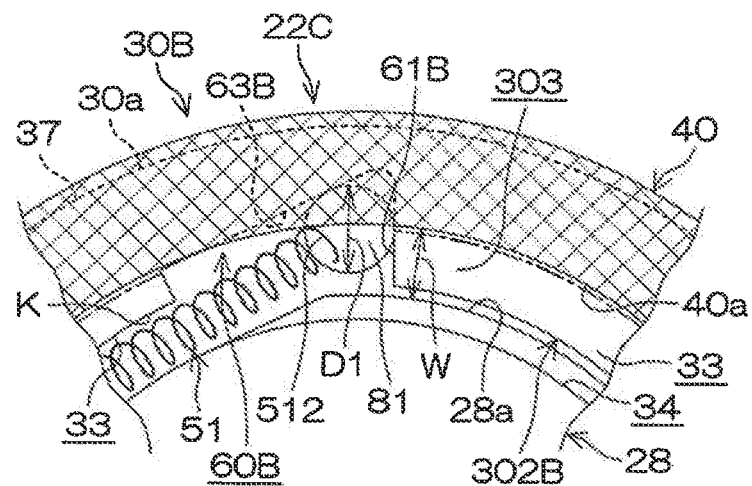
FIG. 10 is a schematic side view of an end surface of a second end of a ball nut included in a ball screw apparatus of a fourth embodiment of the present invention.

In addition, the first stopper ball 81 can be prevented from moving toward the ball screw shaft 28. As a result, the first stopper ball 81 can be effectively suppressed from falling off from the ball nut 30. FIG. 10 is a schematic side view of the end surface 303 of the second end 302 of the ball nut 30 included in a ball screw apparatus 22C of a fourth embodiment of the present invention.

Components of the third embodiment in FIG. 10 which are the same as those of the third embodiment in FIG. 9A are denoted by the same reference numerals as those in the third embodiment. The ball screw apparatus 22C of the fourth embodiment in FIG. 10 is different from the ball screw apparatus 22B of the third embodiment in FIG. 9A in that the first stopper ball 81 and/or the first coil spring 51 are/is prevented from falling off from the first recessed portion 60 of the first coil spring 51 by use of the retaining ring 40 (see FIG. 3 or the like) that prevents the ball nut 30 from moving in the axial direction with respect to the piston 17 (see FIG. 3 or the like).

As described above, the retaining ring 40 is fitted in the annular groove formed in the inner periphery 17b of the piston 17. When the ball screw apparatus 22C is in the assembled state, the retaining ring 40 engages with an outer peripheral portion of the end surface 303 of the second end 302. In other words, the retaining ring 40 faces the end surface 303 of the second end 302 of the ball nut 30 so as to extend along the outer periphery of the ball nut 30.

A distance W between the outer periphery 28a of the ball screw shaft 28 (a ridgeline of a portion adjacent to the ball track 34) and an inner peripheral edge 40a of the retaining ring 40 is set shorter than the diameter D1 of the first stopper ball 81 (W<D1) when the retaining ring 40 is in place. Thus, the first stopper ball 81 and/or the first coil spring 51 can be prevented from falling off from the ball nut 30. Furthermore, the retaining ring 40 intended to prevent the ball nut 30 from moving in the axial direction (axial direction AX (see FIG. 3 or the like)) with respect to the piston 17 is also used as an annular member for prevention of fall-off. This eliminates the need for a separate annular member for prevention of fall-off. Consequently, the number of components and costs can be reduced.

Figure 11:
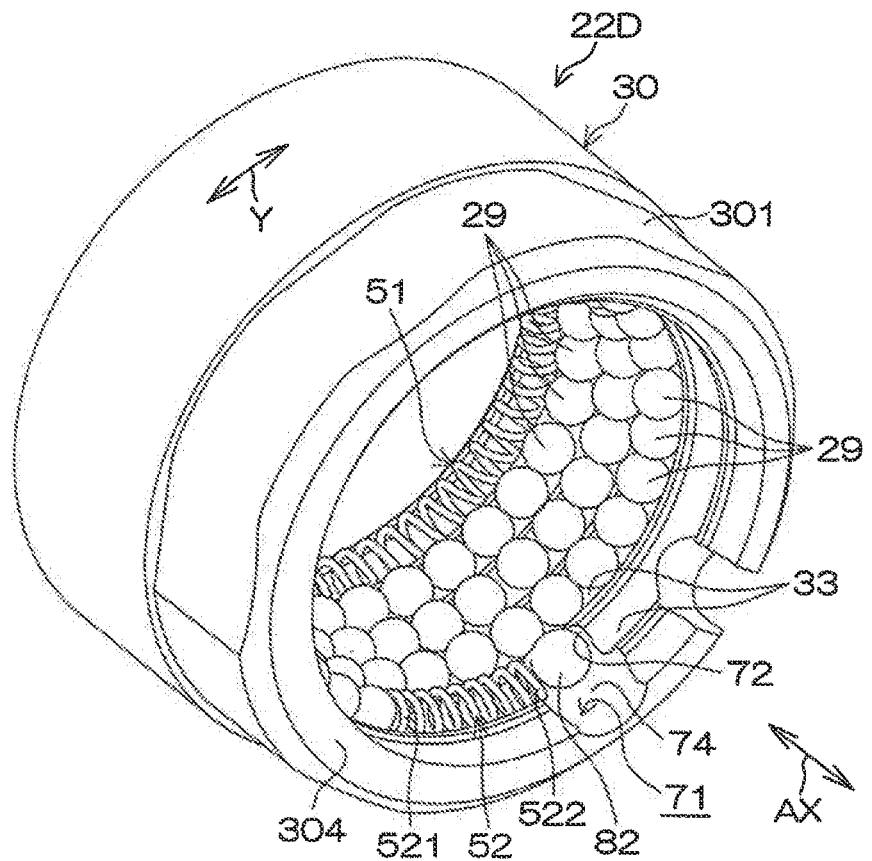
FIG. 11 is a perspective view of the main part of a ball screw apparatus of a fifth embodiment of the present invention as viewed from an end of the ball screw apparatus closer to a disc.
Figure 12:
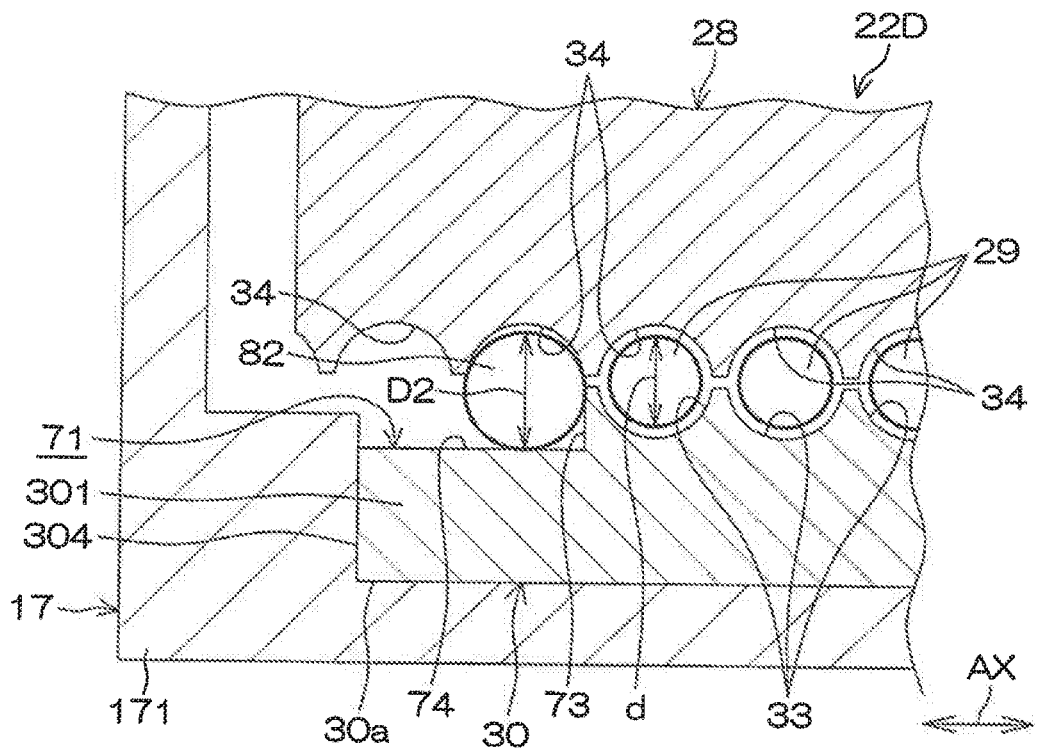
FIG. 12 is a sectional view of the main part of the ball screw apparatus of the fifth embodiment of the present invention and depicting sectional views of a ball screw shaft, a ball nut, and a piston.

The annular member for prevention of fall-off may be provided separately from the retaining ring 40 that prevents the ball nut 30 from moving in the axial direction (axial direction AX) with respect to the piston 17. For the first recessed portion 60B, the fourth embodiment can also produce the same effects as those of the third embodiment. In the fourth embodiment, with the first recessed portion 60B of the third embodiment taken as an example of the recessed portion, the configuration has been described which prevents the first stopper ball 81 and/or the first coil spring 51 from falling off from the first recessed portion 60B. However, as a recessed portion for fall-off prevention, another recessed portion (for example, the first recessed portion 60 (see FIG. 4A or the like)) may be used. FIG. 11 is a perspective view of the main part of a ball screw apparatus 22D of a fifth embodiment as viewed from an end of the ball screw apparatus 22D closer to the disc 2 (see FIG. 1 or the like). In FIG. 11, a configuration is depicted in which the ball screw shaft 28 (see FIG. 1 or the like) and the piston 17 (see FIG. 1 or the like) are not provided. FIG. 12 is a sectional view of the main part of the ball screw apparatus 22D of the fifth embodiment of the present invention.

Components in FIG. 11 and FIG. 12 which are the same as those of the first embodiment in FIG. 4A are denoted by the same reference numerals as those in the first embodiment. The ball screw apparatus 22D of the fifth embodiment in FIG. 11 and FIG. 12 is different from the ball screw apparatus 22 of the first embodiment in FIG. 4A in that, as the second stopper that supports the second stopper ball 82, a second recessed portion (recessed portion) 71 is formed instead of the protruding portion 70. The second recessed portion 71 supports the second end 522 of the second coil spring 52 via the second stopper ball 82. The diameter D2 of the second stopper ball 82 supported by the second recessed portion 71 is set larger than that of the main ball 29 (D2>d).

The second recessed portion 71 is open in an end surface 304 at the first end 301 of the ball nut 30. The second recessed portion 71 is elongated along the ball screw axial direction (axial direction AX) and has a length corresponding to the width of portions (for example, two portions) of the ball track 33. In other words, the second recessed portion 71 is formed to extend from the end surface 304 of the first end 301 to penetrate the portions (for example, two portions) of the ball track 33 in the ball screw axial direction (axial direction AX). The width of the second recessed portion 71 in a ball nut circumferential direction Y is larger than the diameter of the second stopper ball 82. That is, the second stopper ball 82 is housed in the second recessed portion 71.

The second recessed portion 71 has a bearing surface 72 (see FIG. 11), a regulation surface (see FIG. 12) 73, and a third surface 74. The bearing surface 72 supports the second end 522 of the second coil spring 52 via the second stopper ball 82. The regulation surface 73 intersects the bearing surface 72 to regulate movement of the second stopper ball 82 in the axial direction AX. The third surface 74 intersects each of the bearing surface 72 and the regulation surface 73 to define a bottom surface of the second recessed portion 71. The third surface 74 may be formed of such a flat surface as depicted in FIG. 12. Alternatively, the third surface 74 may be formed of a circular arc surface centered around a direction along the ball screw axial direction (axial direction AX).

The third surface 74 presses the second stopper ball 82 against the ball track 34 in the ball screw shaft 28. In other words, the second stopper ball 82 is sandwiched between the third surface 74 and the ball track 34 of the ball screw shaft 28 (the ridgeline defining the ball track 34). Thus, movement of the second stopper ball 82 with respect to the ball nut 30 is regulated (the second stopper ball 82 is fixed). Consequently, the second stopper ball 82 can be held in the ball nut 30 without a backlash.

Figure 13:
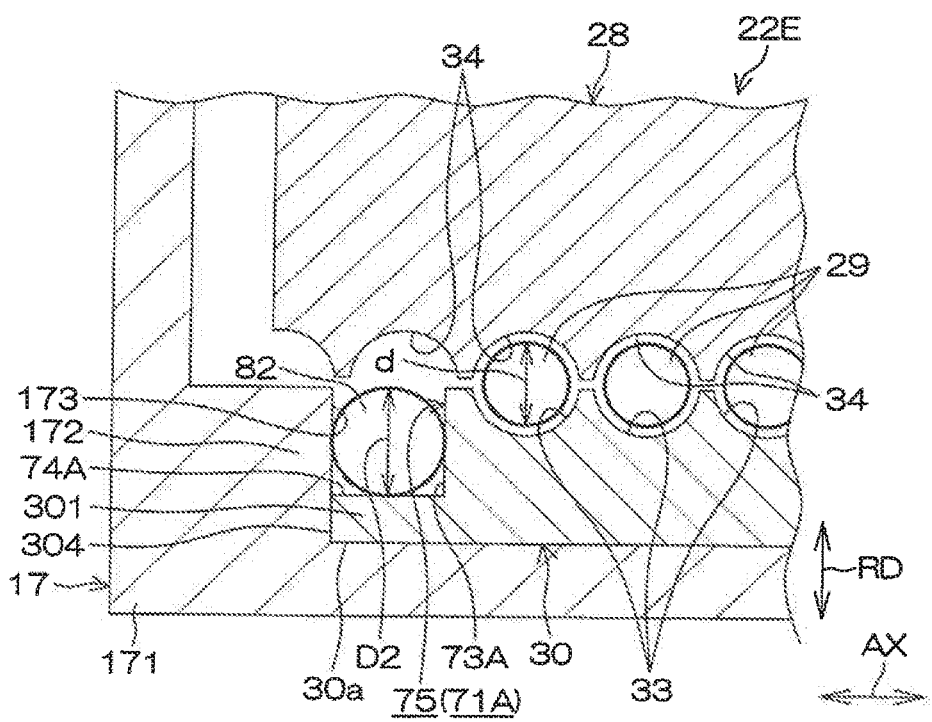
FIG. 13 is a sectional view of the main part of the ball screw apparatus of a sixth embodiment of the present invention and depicting sectional views of a ball screw shaft, the ball nut, and a piston.

The movement of the second stopper ball 82 with respect to the ball nut 30 may be regulated by sandwiching the second stopper ball 82 between the regulation surface 73 of the ball nut 30 and the ball track 34 of the ball screw shaft 28 having the ridgeline extending in a lead angle direction. FIG. 13 is a sectional view of the main part of a ball screw apparatus 22E of a sixth embodiment of the present invention.

Components in FIG. 13 which are the same as those of the fifth embodiment in FIGS. 11 and 12 are denoted by the same reference numerals as those in the first embodiment. The ball screw apparatus 22E of the sixth embodiment in FIG. 13 is different from the ball screw apparatus 22D of the fifth embodiment in FIG. 11 and FIG. 12 in that, as the second stopper, a second recessed portion (recessed portion) 71A is formed instead of the second recessed portion 71. The second recessed portion 71A supports the second end 522 (see FIG. 11 or the like) of the second coil spring 52 (see FIG. 11 or the like) via the second stopper ball 82. The following description takes, as an example, a case where the diameter D2 of the second stopper ball 82 supported by the second recessed portion 71A is larger than the diameter of the main ball 29 (D2>d). However, the diameter D2 of the second stopper ball 82 may be the same as the diameter d of the main ball 29 (D2=d) or may be smaller than the diameter d of the main ball 29 (D2<d).

The second recessed portion 71A includes a recessed step portion 75 that is continuous with the end surface 304 of the first end 301 of the ball nut 30. The depth of the recessed step portion 75 in the ball nut radial direction RD is equivalent to the diameter of the second stopper ball 82. That is, the recessed step portion 75 can house one second stopper ball 82. As depicted in FIG. 1, the piston 17 is shaped like a bottomed cylinder that is closed at the end 171 of the piston 17 (the end closer to the disc 2). As depicted in FIG. 13, a protrusion 172 that protrudes in a direction away from the disc 2 (see FIG. 1) is provided at an outer peripheral portion of the end 171 of the piston 17. The protrusion 172 has an opposite surface 173 facing the recessed step portion 75 (to be exact, a regulation surface 73A) of the second recessed portion 71A. The opposite surface 173 may be annular or may be provided only in an area facing the recessed step portion 75.

As depicted in FIG. 13, the recessed step portion 75 has a bearing surface (not depicted in the drawings), the regulation surface 73A, and a bottom surface 74A. The bearing surface supports the second end 522 of the second coil spring 52 via the second stopper ball 82. The regulation surface 73A intersects the bearing surface to regulate movement of the second stopper ball 82 in the axial direction AX. The bottom surface 74A intersects each of the bearing surface and the regulation surface 73A to define the bottom surface of the recessed step portion 75. The bottom surface 74A may be formed of such a flat surface as depicted in FIG. 13. The bottom surface 74A may be formed of a circular arc surface centered around a direction along the ball screw axial direction (axial direction AX).

The regulation surface 73A presses the second stopper ball 82 against the opposite surface 173. In other words, the second stopper ball 82 is sandwiched between the recessed step portion 75 and the opposite surface 173. Thus, movement of the second stopper ball 82 with respect to the ball nut 30 is regulated (the second stopper ball 82 is fixed). Consequently, the second stopper ball 82 can be held in the ball nut 30 without a backlash.

The present invention is not limited to the first to sixth embodiments. Although not depicted in the drawings, in a seventh embodiment that is a variation of the fifth embodiment in FIG. 11 and FIG. 12, a recessed portion having the same configuration as the recessed portion that supports the first stopper ball 81 may be used as the stopper that supports the second stopper ball 82, and the diameter of the second stopper ball 82 supported by the recessed portion may be larger than the diameter of the main ball 29. In that case, one of the first coil spring 51 and the first stopper ball 81 may be removed.

Although not depicted in the drawings, in an eighth embodiment that is a variation of the second embodiment in FIG. 8, the second coil spring 52 is removed, and the main ball 29b at the second end Lb of the ball train L is directly engaged with and supported by the protruding portion 70. Although not depicted in the drawings, in a ninth embodiment that is a variation of the first embodiment in FIGS. 4A and 4B and a tenth embodiment that is a variation of the second embodiment in FIG. 8, a protruding portion having the same configuration as the protruding portion 70 (second stopper) is used as the stopper that supports the first stopper ball 81, instead of the first recessed portion 60.

Figure 14:
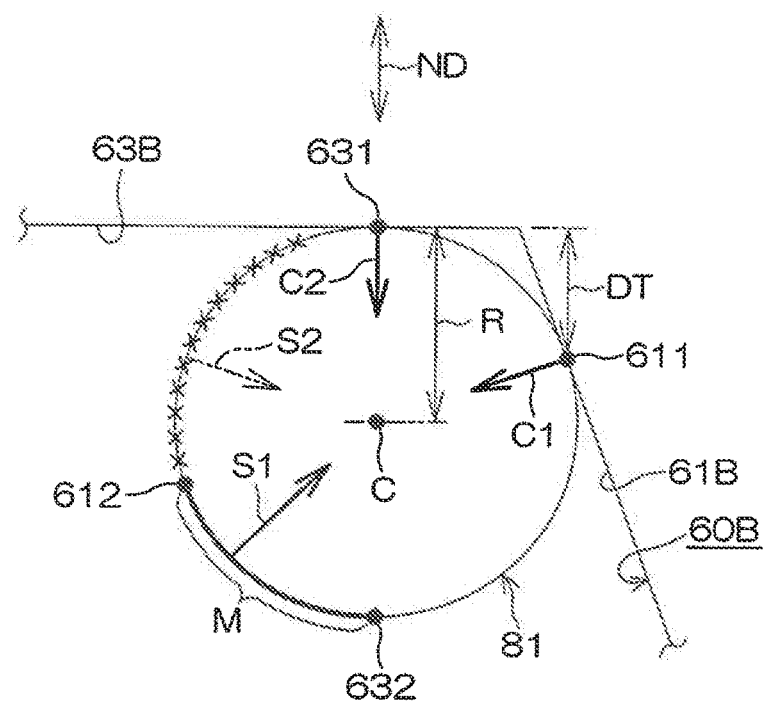
FIG. 14 is a schematic diagram illustrating a force acting on a stopper ball included in a ball screw apparatus of an eleventh embodiment of the present invention.

FIG. 14 is a schematic diagram illustrating a force acting on the first stopper ball 81 included in a ball screw apparatus of an eleventh embodiment that is a variation of the third embodiment in FIGS. 9A and 9B. Components in FIG. 14 which are the same as those of the third embodiment in FIGS. 9A and 9B are denoted by the same reference numerals as those in the third embodiment. In the eleventh embodiment, the intersecting angle between the first surface 61B and the second surface 63B is an obtuse angle, and thus, the distance DT between the first contact point 611 and the second contact point 631 in the normal direction ND is set smaller than the radius R of the first stopper ball 81 (DT<R). Even in this case, if the spring force S1 from the first coil spring 51 (see FIG. 9A or the like) toward the center C is applied to the intermediate area M between the first opposite position 612 and the second opposite position 632 in the surface of the first stopper ball 81, the first stopper ball 81 is pressed against the second surface 63B.

For example, it is assumed that the spring force acts on the area between the first opposite position 612 and the second contact point 631 (indicated by "x" in FIG. 14) as viewed in a cross section orthogonal to the axial direction of the ball nut 30 (axial direction AX (see FIG. 1 or the like)) (the spring force in this case is represented as a spring force S2 in FIG. 14). In this case, the first stopper ball 81 is not pressed against the second surface 63B. This may result in a backlash of the first stopper ball 81 in the ball nut radial direction RD. Moreover, the first stopper ball 81 may fall off from the ball nut 30.

In contrast, in the eleventh embodiment, the spring force S1 from the first coil spring 51 toward the center C is applied to the intermediate area M between the first opposite position 612 and the second opposite position 632 in the surface of the first stopper ball 81. Thus, the first stopper ball 81 is pressed against the second surface 63B. Therefore, even in this case, the first stopper ball 81 can be held without a backlash in the ball nut radial direction RD. In addition, the first stopper ball 81 can be effectively prevented from falling off from the ball nut 30.

In each of the above-described embodiments, a third coil spring (not depicted in the drawings) may be interposed at one or more positions in an intermediate portion of the ball train L. Various modifications may be made to the present invention within the scope of the invention.

What is claimed is:

1. A ball screw apparatus comprising:
   a ball nut including an inner periphery, a ball track formed in the inner periphery, and a second stopper, wherein the second stopper includes a second recessed portion formed in the inner periphery of the ball nut,
   a ball screw shaft including an outer periphery and a ball track formed in the outer periphery, the ball screw shaft being inserted through the ball nut;
   a ball train including a plurality of main balls housed in a raceway formed between the ball track of the ball nut and the ball track of the ball screw shaft;
   a second coil spring including a first end that engages with a second end of the ball train and a second end supported by the second stopper and housed in the raceway; and
   a second stopper ball held in the raceway and interposed between the second recessed portion and the second end of the coil spring and having a larger diameter than the main balls,
   wherein the second recessed portion holds the second stopper ball such that the second stopper ball is sandwiched between the second recessed portion and the ball track of the ball screw shaft to regulate movement of the second stopper ball with respect to the ball nut,
   wherein the second recessed portion is elongated along an axial direction of the ball screw shaft and has a length corresponding to a width of a plurality of tracks of the ball track of the ball nut, and
   wherein the second recessed portion is shaped as a circular arc, a diameter of the circular arc being larger than a diameter of the second stopper ball.

2. The ball screw apparatus according to claim 1, wherein the ball nut includes a bearing surface, a regulation surface and a third surface that define the second recessed portion,
   the bearing surface supports the second end of the second coil spring via the second stopper ball, the regulation surface intersects the bearing surface to regulate movement of the second stopper ball in the axial direction of the ball screw shaft, and the third surface intersects each of the bearing surface and the regulation surface to define a bottom surface of the second recessed portion.

3. The ball screw apparatus according to claim 2, wherein the second stopper ball is sandwiched between the third surface and the ball track of the ball screw shaft.

4. The ball screw apparatus according to claim 1, wherein the diameter of the second stopper ball is larger than an inside diameter of an end turn portion of the second coil spring corresponding to the second end, and the second stopper ball functions to support the second coil spring by being in contact with an inner periphery of the end turn portion of the second coil spring.

5. The ball screw apparatus according to claim 1, further comprising:

a first stopper, a first coil spring including a first end that engages with a first end of the ball train, and a second end that is supported by the first stopper, and a first stopper ball is interposed between the first stopper and the second end of the first coil spring.

6. The ball screw apparatus according to claim 5, wherein the first stopper includes a first recessed portion formed in the inner periphery of the ball nut, and the first stopper ball is held in the first recessed portion and interposed between the first recessed portion and the second end of the first coil spring.

7. The ball screw apparatus according to claim 5, wherein a diameter of the first stopper ball is larger than an inside diameter of an end turn portion of the first coil spring corresponding to the second end, and the first stopper ball functions to support the first coil spring by being in contact with an inner periphery of the end turn portion of the first coil spring.

* * * * *